US009143080B2

(12) United States Patent
Rogers

(10) Patent No.: US 9,143,080 B2
(45) Date of Patent: Sep. 22, 2015

(54) SYNTHETIC SPACE VECTOR MODULATION

(71) Applicant: L Warren Rogers, Salinas, CA (US)

(72) Inventor: L Warren Rogers, Salinas, CA (US)

(*) Notice: Subject to any disclaimer, the term of this patent is extended or adjusted under 35 U.S.C. 154(b) by 0 days.

(21) Appl. No.: 14/292,746

(22) Filed: May 30, 2014

(65) Prior Publication Data

US 2014/0361724 A1   Dec. 11, 2014

Related U.S. Application Data

(60) Provisional application No. 61/831,697, filed on Jun. 6, 2013.

(51) Int. Cl.
*H02P 23/00*  (2006.01)
*H02P 27/08*  (2006.01)
*H02M 7/5395*  (2006.01)
*H02M 7/5387*  (2007.01)

(52) U.S. Cl.
CPC .............. *H02P 27/08* (2013.01); *H02M 7/5395* (2013.01); *H02M 2007/53876* (2013.01)

(58) Field of Classification Search
CPC .................................................. H02P 23/0095
USPC .......................................... 318/807, 767, 727
See application file for complete search history.

(56) References Cited

U.S. PATENT DOCUMENTS 7,952,896 B2 *   5/2011   Hu et al. .......................... 363/37

OTHER PUBLICATIONS

Brendan Peter McGrath, Optimized Space Vector Switching Sequences for Multilevel Inverters, IEEE Transactions on Power Electronics, vol. 18, No. 6, Nov. 2003.

* cited by examiner

*Primary Examiner* — David S Luo

(57) ABSTRACT

A synthetic space vector modulation method and device for controlling a voltage source inverter and load is provided. The device and method comprise a variable frequency oscillator (VFO), a center-aligned pulse-train signal generator, a modulo-N counter, and a three-phase time division multiplexer. The VFO outputs a square wave to the modulo-N counter and a triangle wave of the same frequency to the center-aligned pulse-train signal generator, the outputs of the center-aligned pulse-train generator and the modulo-N counter are sent to the three-phase time division multiplexers, and after leaving the multiplexers, and before being sent to the VSI controller's load each positive and each negative output of the multiplexing phase is sent to a turn-on delay. The present innovation makes VSI controller acquisition and repair almost as simple as buying and repairing a transistor radio.

20 Claims, 17 Drawing Sheets

SYNTHETIC SPACE VECTOR MODULATION

The current application claims a priority to the U.S. Provisional Patent application Ser. No. 61/831,697 filed on Jun. 6, 2013.

FIELD OF THE INVENTION

The present invention relates generally to an apparatus and method in which a space vector modulation scheme is used to convert voltage signals into usable switching signals for alternating current (AC) motors. This invention uses simple readily available electronics to create a synthetic Space Vector Modulation operation.

BACKGROUND OF THE INVENTION

Although electric motors were invented a long time ago, there are still areas where improvements can be made to develop better and more efficient motors. The AC induction motors are the most common motors used in motion control systems, as well as in powering home appliances and in recent years in military machinery. Most common method of AC motor power generation is the three phase pulse switching system which is basically three circuit conductors carrying three signals, identical in frequency and amplitude but separated by phase providing the rotating magnetic field used in AC motors. A Voltage Source Inverter (VSI) is rarely used unless it's amplifying either Pulse Width Modulation (PWM) or Space Vector Modulation (SVM) signals, which then usually provide power to a three-phase motor. The SVM technique, which is an optimum PWM technique, appears to be the best alternative for a three phase switching power converter because it reduces switching (or commutation) losses in the power semiconductor. The space vector modulation technique has been increasingly used in the last decade, because it not only delivers an optimal output taking advantage of reduced, but not totally eliminated, harmonics of the output voltage or current. Furthermore, three phase alternating current motors are rugged, high-torque, single-speed devices, limited to whatever frequency their power supply provides them. A voltage source inverter and controller provide power to an AC motor at any frequency & voltage up to the VSI's limits putting rugged, high-torque AC motors where only variable speed DC motors used to be able to go. Modern VSI controllers provide adjustable speed, fast response time and are more efficient than historical VSI controllers, but are expensive and hard to repair (if necessary or the dealer can't be reached) because most modern VSI controllers are dependent on software or somewhat rare hardware. The present innovation makes VSI controller acquisition and repair almost as simple as buying and repairing a transistor radio. The present invention can potentially be used in, but not limited to Diesel-Electric locomotive manufacturers, Ship builders, Manufacturers of armored cars, Large earth-moving equipment, Manufacturers of trash compactors, washing machines and dryers.

DETAIL DESCRIPTIONS OF THE INVENTION

All illustrations of the drawings are for the purpose of describing selected versions of the present invention and are not intended to limit the scope of the present invention.

Figure 2:
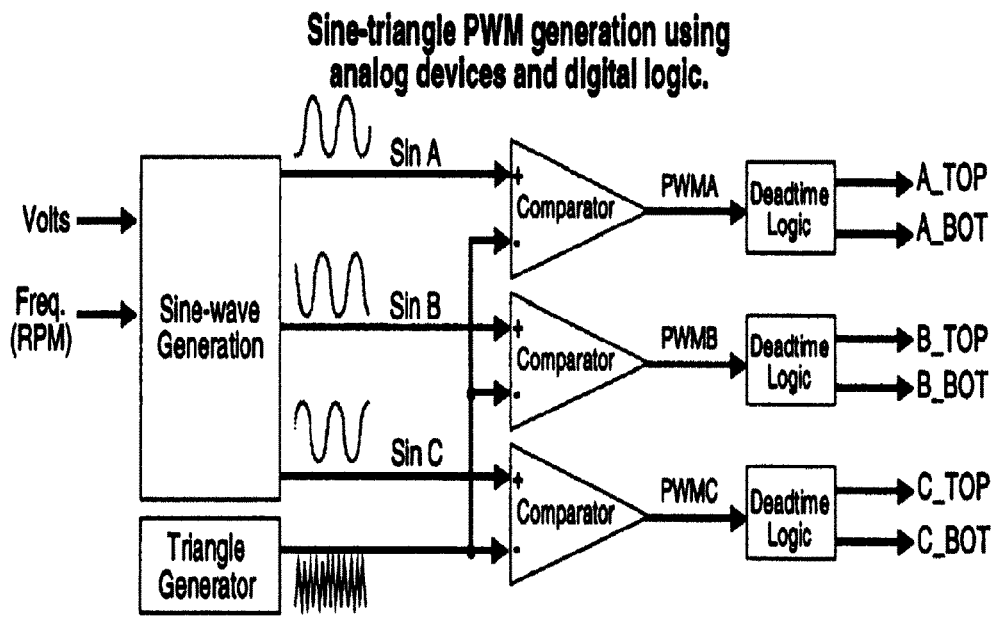
FIG. 2 is an illustration of PWM generation developed through (1) dedicated electronics or by (2) a CPU.
Figure 2:
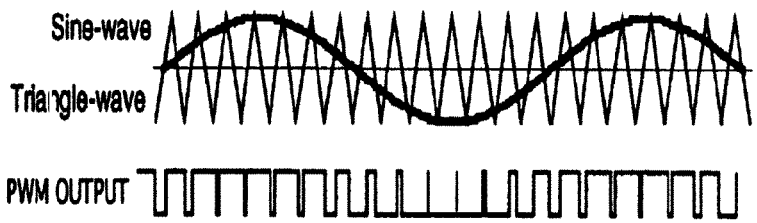
Figure 2:
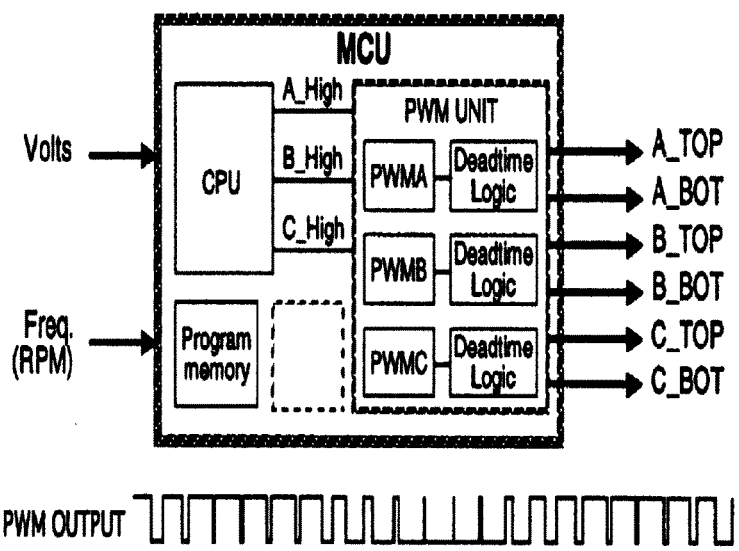

Pulse width modulation is a waveform digitization scheme whereby, once digitized, the waveform is amplified and reconstructed at the point of application via filtering. Without a digitization scheme, the amplification would be performed linearly and losses would be exorbitant. Pulse width modulation signals may be constructed using analog or digital methods, as depicted in FIG. 2, but the exact reconstruction of the original waveform is dependent on the sawtooth's frequency being several times higher than the modulation signal's frequency; however, for power electronics devices higher switching frequencies result in higher switching losses as detailed in N. Mohan, T. M. Undeland and W. P. Robbins, Power Electronics, 3rd ed., New York, N.Y.; Wiley, 2003 and Zhou and Wang, "Relationship between Space-Vector Modulation and Three-Phase Carrier Based PWM: A Comprehensive Analysis", IEEE Transactions on Industrial Electronics, vol. 49, no. 1, February 2002.

Figure 1:
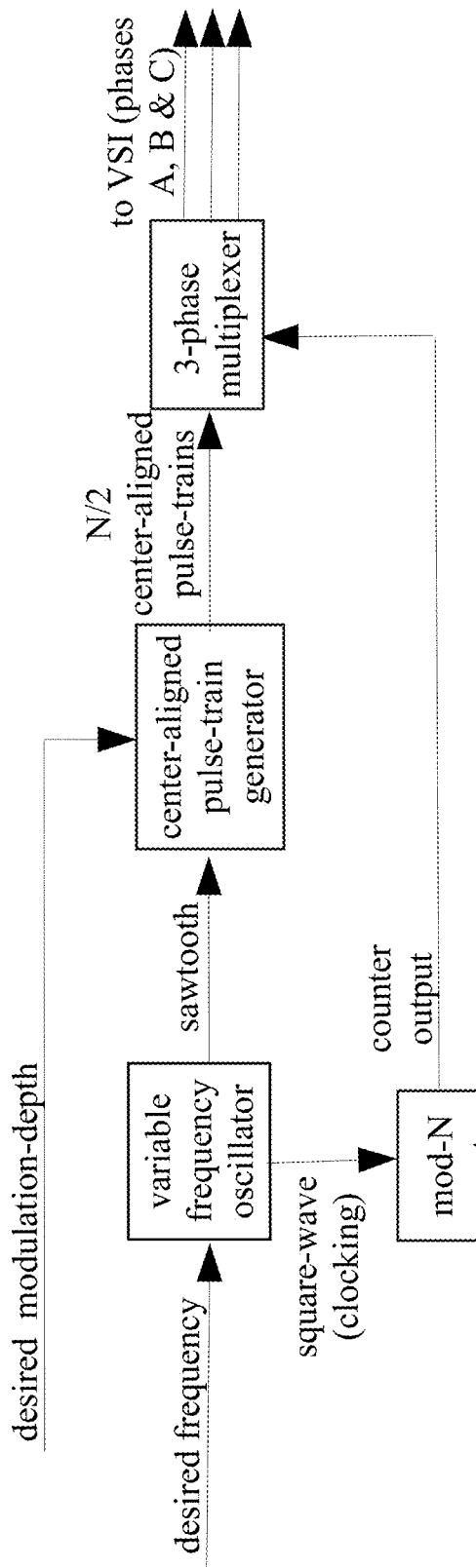
FIG. 1 is the Synthetic Space Vector Modulation unit (VSI controller) functional breakdown labeled—the internal operation of both the Mod-6 and Mod-12 units.
Figure 3:
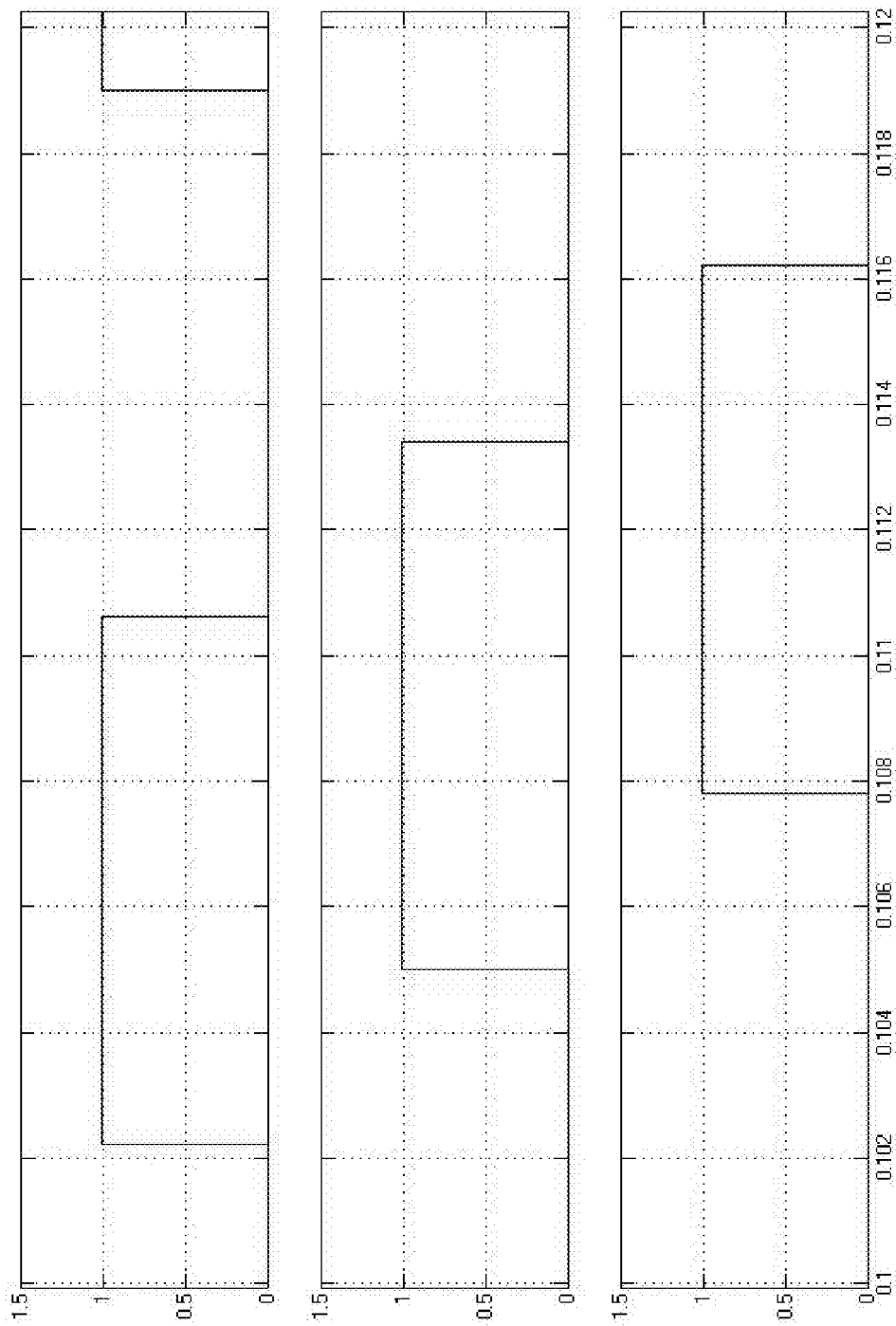
FIG. 3 is a 3-Bit Johnson Counter's Three Outputs, with the Output of Flip-Flop 'A' at the top, Flip-Flop 'B' in the center, and Flip-Flop 'C' at the bottom.
Figure 4:
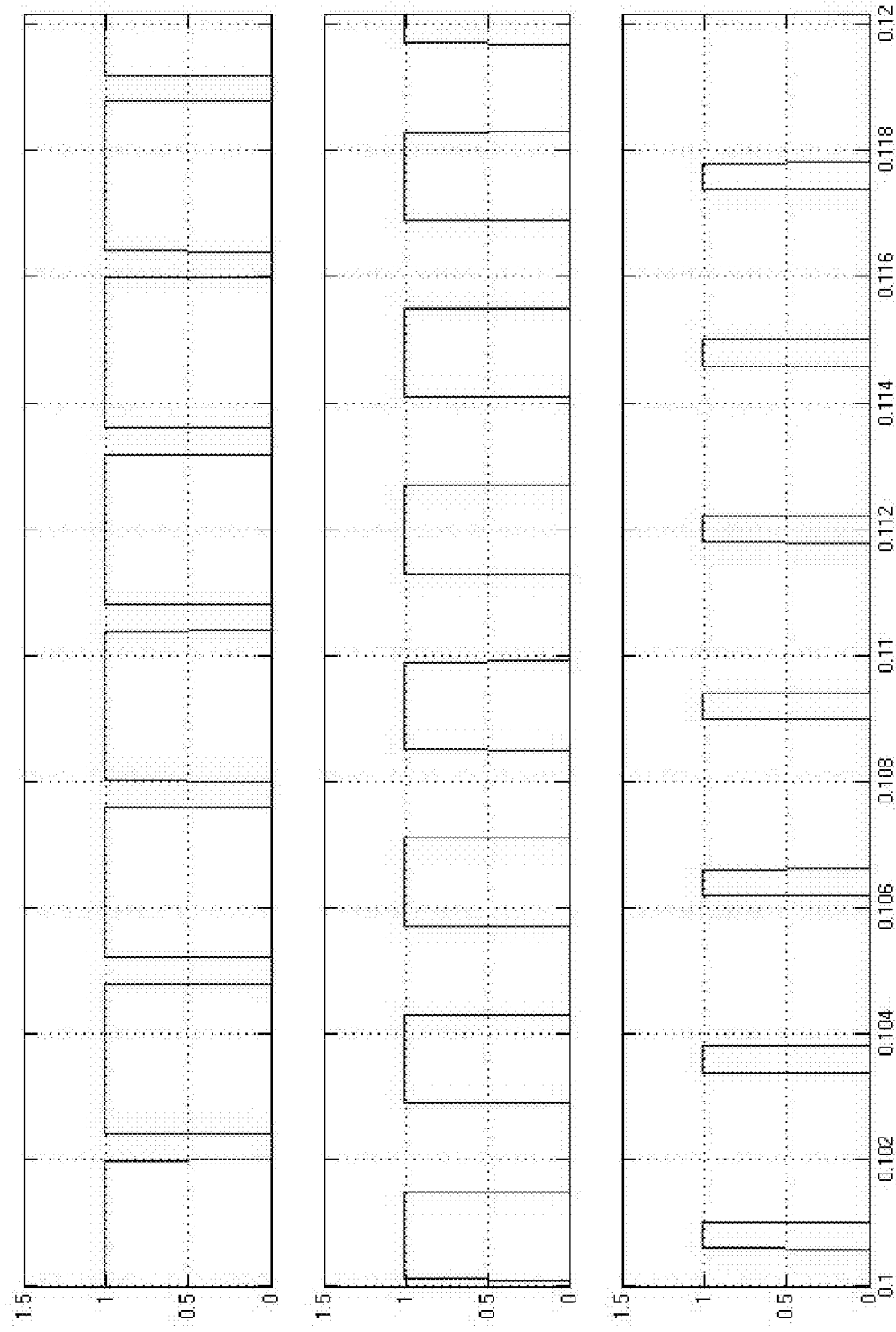
FIG. 4 is three Center aligned pulse trains going into a mod-6 unit's 3-phase multiplexer.

Space vector modulation can be reproduced using center-aligned pulse-trains on PWM equipment. The present invention will demonstrate synthetic-SVM which is independent of software and PWM equipment. Since synthetic-SVM hardware produces the same behaviors in upstream and downstream equipment as authentic SVM equipment, it can be considered equivalent. Omeje, Nnadi & Odeh, "Comparative Analysis of Space Vector Pulse-Width Modulation and Third Harmonic Injected Modulation on Industrial Drives", The Pacific Journal of Science and Technology, vol. 13, no. 1, May 2012 simulated third harmonic injected sine waves replicating PWM and SVM waveforms in Simulink. The results produced for third harmonic injected sine wave so closely reproduced the results produced for SVM the researchers concluded the two voltage production methods were practically identical. The electronics designed for the present invention began with a Variable Frequency Oscillator (VFO) at six times the desired frequency, three center-aligned pulse trains, a modulo-6 (synchronizing) counter for the follow-on three-phase multiplexer as shown in FIG. 1. The counter reproduces the sequence found on the left side of Table 2 and shown in FIG. 3. Given the above in conjunction with a VSI, there are other considerations for functionality of the system. In order to prevent shoot-through in a VSI switch leg, dead-time must exist between the turn-off of one switch and the turn-on of the other switch. Shoot-through occurs if both switches are simultaneously 'on' due to the characteristics of real switch operations. The shoot-through or short-circuit path is across the DC bus feeding the VSI. In order to control the rotational speed of the load machine, the oscillator should have an adjustable frequency. This is accomplished by the frequency selecting potentiometer circled and labeled in FIGS. 8 (NE566), 10 (NE555) and 12 (NE555) as 100a. The potentiometer & IC circuitry surrounding the NE555 is more common than that surrounding the NE566. The NE555 has three resistors in series supplying current to the capacitor. The NE555 supplies an intermittent short between the top two resistors and a diode shorts out the center resistor (when the NE555 supplied short is not active) of the three when current is flowing through the first resistor and potentiometer into the capacitor. When the short circuit is active, current flows from the capacitor through the potentiometer and the second resistor (the one with the diode in parallel with it) toward the short circuit to ground. If the first resistor is exactly the same as the second, we may treat the diode as an ideal component and the potentiometer has completely shorted itself out, we can get a maximum frequency related to the RC time constant of the capacitance and either of the top two resistors. The lowest frequency is related to the R (potentiometer and either of the top two resistors) C time constant. Notice the current flows through the potentiometer whether the capacitor is charging-up or discharging and if the resistors are the same size, the capacitor takes the same time to charge-up as discharge.

In order to control the magnitude of the output voltage, the modulation index or pulse train width must be adjustable. This is accomplished by the potentiometer circled and labeled in FIGS. 8, 10 and 12 as 100b. We need to compare a constant voltage against a variable voltage. We can find a fairly constant voltage and keep impedance problems from cropping up by isolating it with an Op-Amp wired up as a voltage follower, then compare this with a variable voltage again isolated by an Op-Amp wired up as a voltage follower.

The potentiometer supplies that variable voltage. The output voltage of the right side voltage follower ranges from zero volts to whatever the other voltage follower uses as input. The voltages generated are compared to the bottom half of a zero to fifteen volts sawtooth waveform. The waveform is then flipped over and the variable voltages are compared again to the other half of the sawtooth waveform. In all the variable voltages MUST collapse or expand around the sawtooth's 50% mark.

TABLE 1

A six state (modulo-6) counter sequence fed to the multiplexers.

| Count_Sequence (Johnson Counter) | | | Gray_Code/120° phase sequence (180° "on", 180° "off" & 120° "out-of-phase") | | |
|---|---|---|---|---|---|
| A | B | C | A | B' | C |
| 0 | 0 | 0 | 0 | 1 | 0 |
| 1 | 0 | 0 | 1 | 1 | 0 |
| 1 | 1 | 0 | 1 | 0 | 0 |
| 1 | 1 | 1 | 1 | 0 | 1 |
| 0 | 1 | 1 | 0 | 0 | 1 |
| 0 | 0 | 1 | 0 | 1 | 1 |

Figure 9:
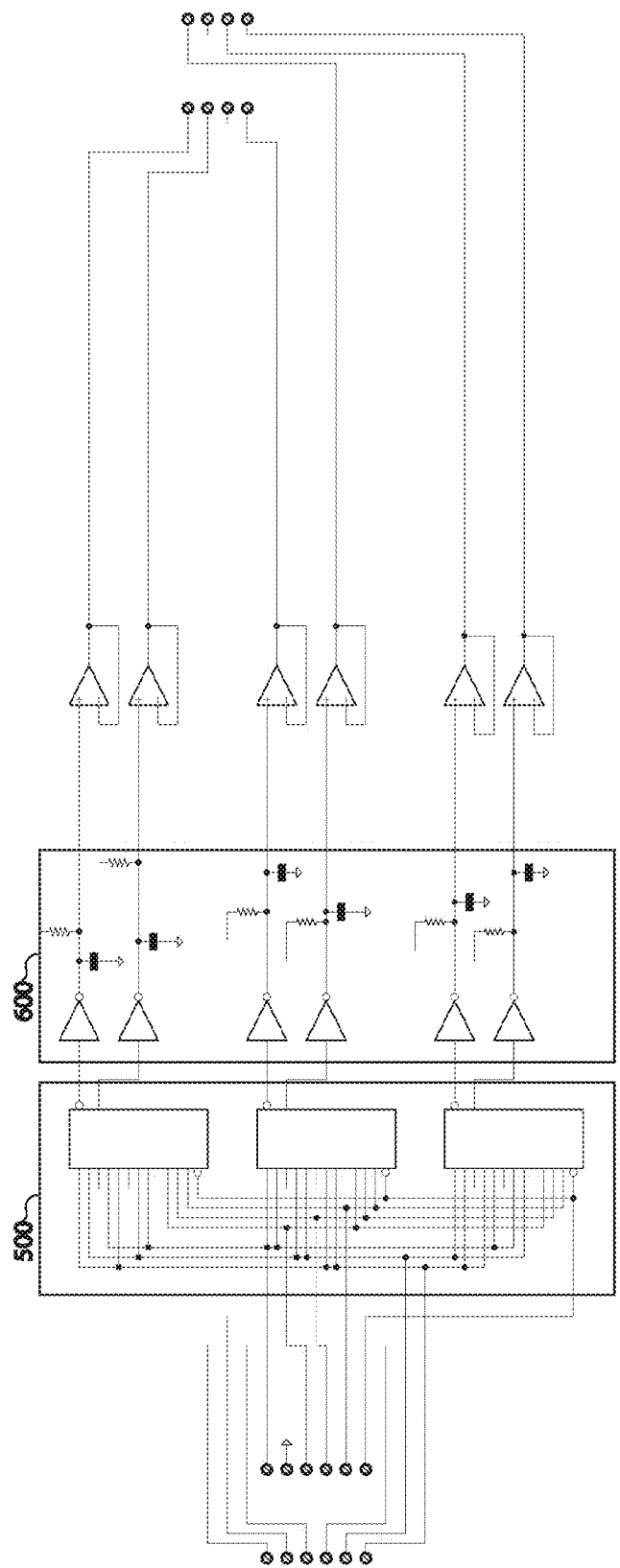
FIG. 9 is a Mod-6 Synthetic SVM multiplexer with a turn on delays & impedance isolation via voltage followers.
Figure 10:
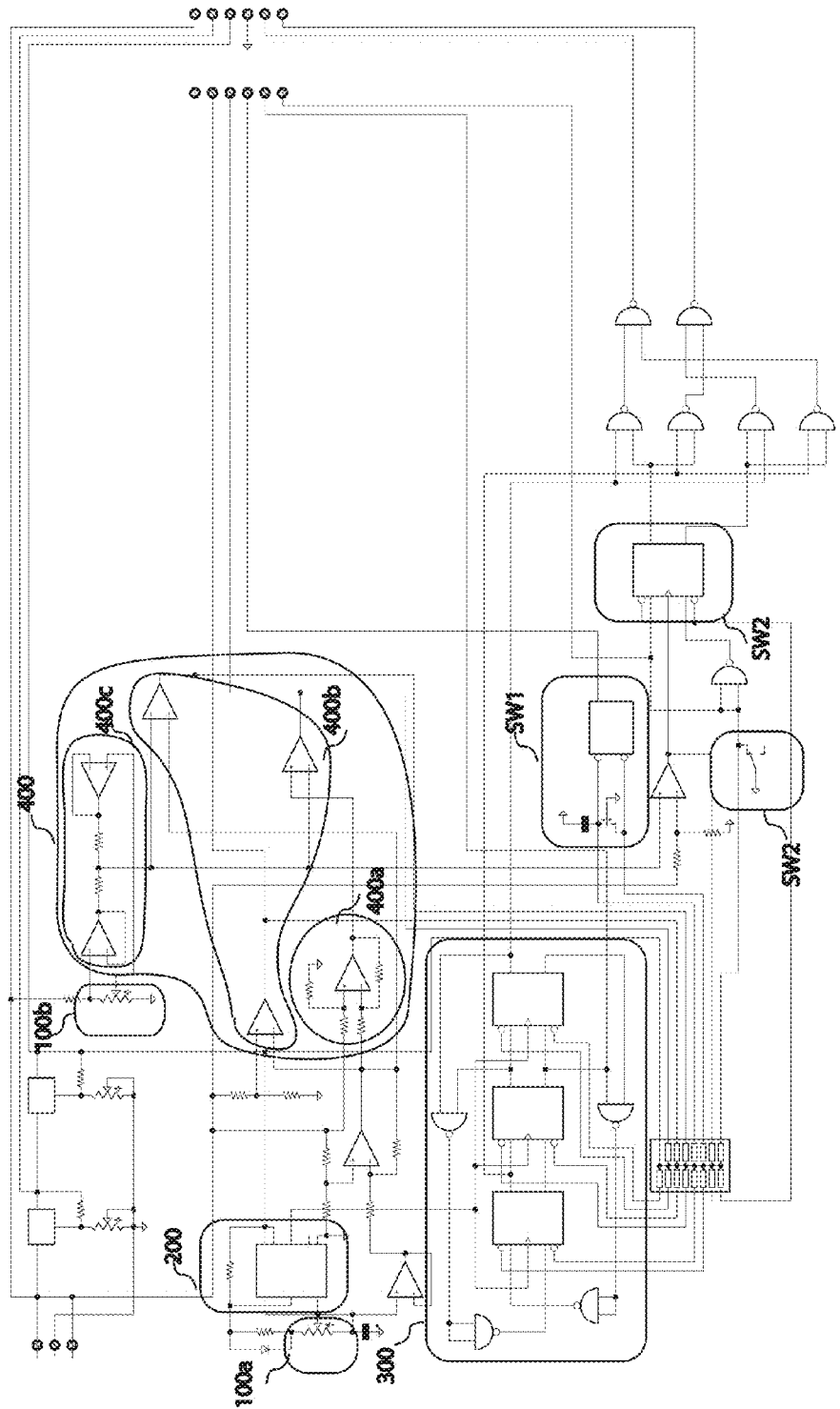
FIG. 10 is another Mod-6 Johnson counter with 3 center aligned pulse-trains circuitry.
Figure 11:
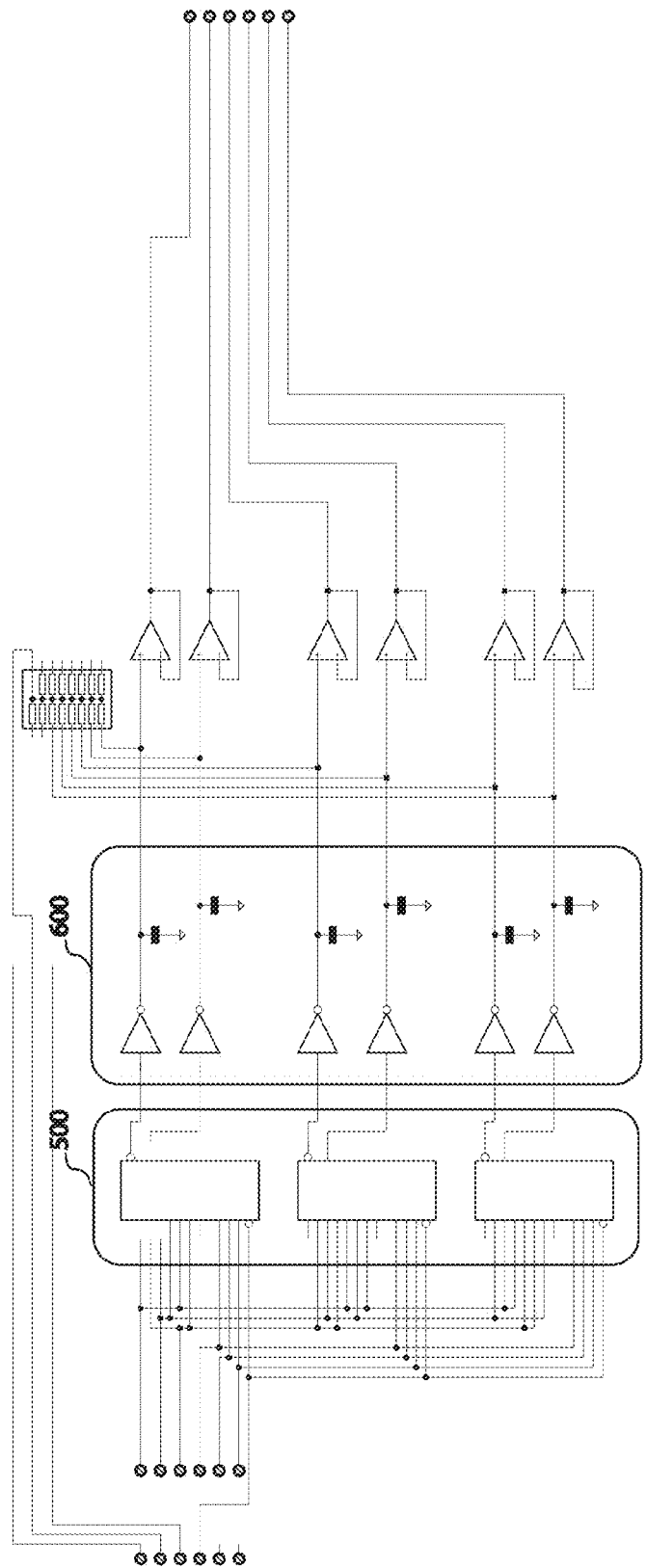
FIG. 11 is another set of three Mod-6 multiplexers with their outputs arranged in output pairs with turn on delays & impedance isolation via voltage followers.

The essentials of the synthetic SVM unit are illustrated in FIG. 1 with more detail in FIGS. 10 & 11 featuring the schematics for a three flip-flop modulo-6 counter designed in conjunction with a variable frequency variable modulation-depth center-aligned pulse-train signal generator and a three-phase multiplexer. The output of the center-aligned pulse-train generator, circled and labeled in FIGS. 8 & 10 (mod-6) and then again in FIG. 12 (mod-12) as 400, and the output of the counter, circled and labeled in FIGS. 8 & 10 (mod-6) and 12 (mod-12) as 300, are sent to a three-phase multiplexer, circled and labeled in FIGS. 9 & 11 (mod-6) and 13 (mod-12) as 500, and each phase is then sent to both positive and negative turn-on delays, circled and labelled in FIGS. 9, 11, and 13 as 600, before appearing at the VSI's input.

The multiplexers that appear in FIG. 9 are part of the back half of the mod-6 SVM unit. Label 500 circles the three multiplexers needed for phases A, B & C. Each multiplexer has both a logical positive and logical negative output. Each output can then be sent to an Open Circuit inverter/driver that is then isolated from impedance effects of later circuits by op-amps wired as "voltage followers". The three pairs of outputs are then sent to Voltage Source Inverters and either a (1) three phase motor or (2) some other type of load. There are cosmetic differences such as using Dual In-line Package (DIP) resistors in FIG. 11 instead of the discrete resistors of FIG. 9. Other minor differences are in the way the address and data lines leading into the multiplexers are drawn. Other than that, the drawings are the same, with the same intention, resistor sizes, integrated chips and time constants as appear on FIG. 9.

FIG. 10 is the front end of a mod-6 SVM unit using an NE555 to generate a variable frequency and constant amplitude sawtooth and squarewave. Labelled 100b, the first potentiometer adjusts from 0 volts to half of the 15 volts that is the sawtooth's final size. Voltage followers keep circuit impedances from playing an unnecessary part in the voltage adjustment process. One of the voltage followers (400c) has a constant mid-sawtooth voltage and the other is adjustable from zero to that mid-sawtooth voltage. Voltage dividers made from resistors (400c) then send the divided voltages to a comparator (one of three labelled 400b) (where the first of the three pulse trains comes from). For the mod-6 SVM device there will always be one 50% duty cycle pulse train (where the second of three pulse trains comes from). After the sawtooth is inverted (400a) it gets compared to the same voltage the first comparator used (where the third of three pulse trains came from).

Figure 12:
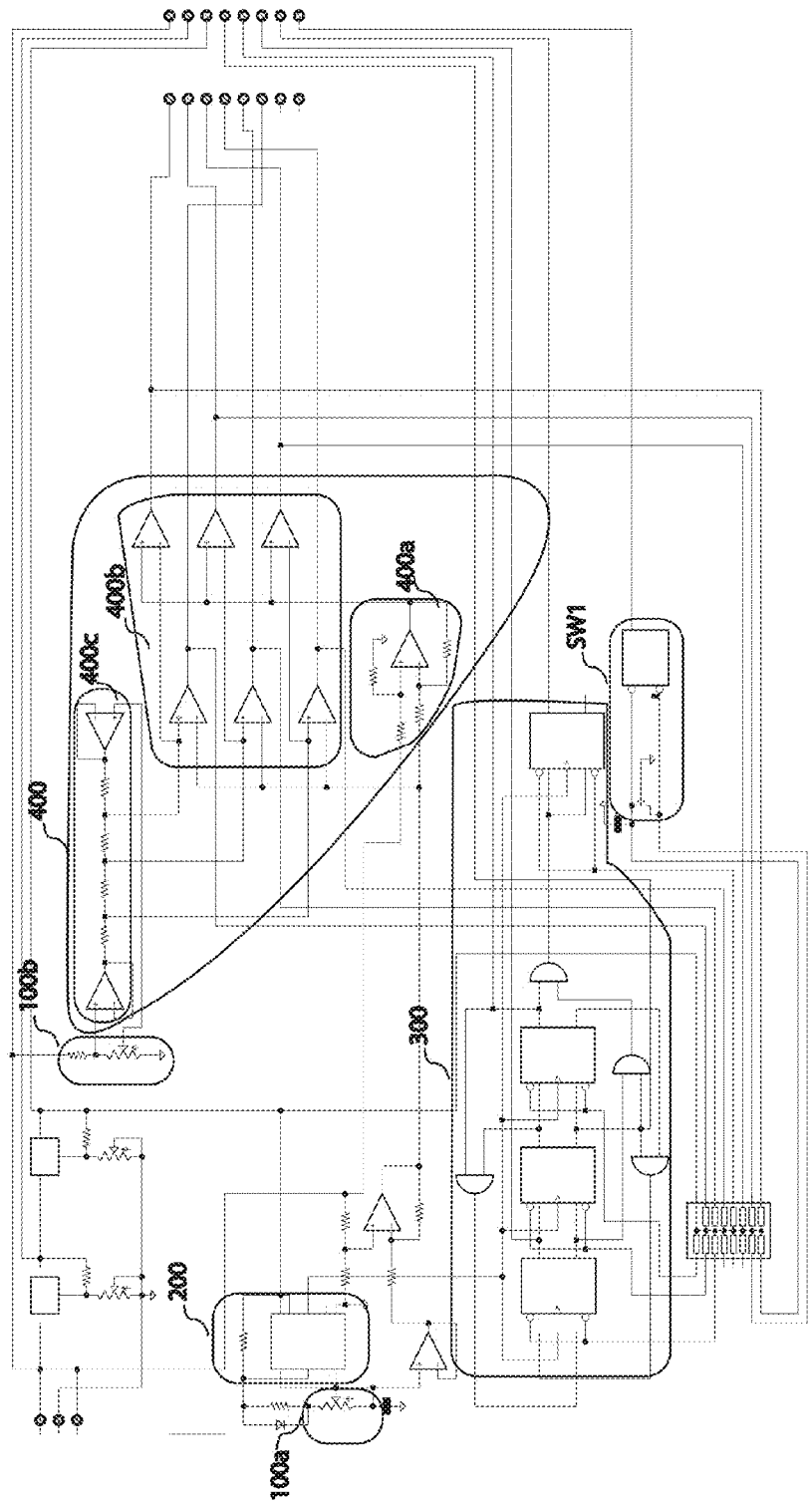
FIG. 12 is a Mod-12 four bit Johnson counter with 6 center aligned pulse-trains circuitry.

In FIG. 12 the label 400 encircles six comparators (400b) and their sawtooth inverter (400a) as well as the differentially opposed voltage followers necessary to create an assortment of voltages that are X % away from the sawtooth's mid-voltage mark (400c). In this case here three voltages appear just beneath the sawtooth waveform's mid-line voltage. After the sawtooth is inverted the same voltages are sent to the second set of three comparators. Altogether six pulse trains are created from six comparators and the pulse trains are then sent to the multiplexers of FIG. 13. The potentiometer of label 100b is manually adjusted between 0 and 9 volts. The voltage follower attached to the top of the potentiometer is at a constant 9 volts while the voltage follower attached to the potentiometer's wiper goes from 0 to 9 volts. The voltages coming off the resistive divider are evenly split between zero & the sawtooth's 9 volt mid-point. At one of the potentiometer's extremes the 3 voltages are gathered around the sawtooth's mid-point with only hundredths of a volt between them. At the other extreme the three voltages are gathered between zero & the sawtooth's midpoint with one constant voltage line at about 0.5 volts, another at 4 volts & another at 7.5 volts. When the sawtooth is inverted the three voltages are used again. What comes out of the 6 comparators is 6 symmetric, well-proportioned pulse trains that look symmetric and well-proportioned at any modulation depth potentiometer setting.

The potentiometer inside label 100a is the third of three resistors leading to a capacitor. The second resistor is shorted by a cathode-down pointed diode. The NE555 has a shorting connection between the first resistor and the second.

When the NE555 is acting as a short at that connection, current flows out of the capacitor, through the potentiometer, through resistor number 2 and out the short. When the NE555 is acting as an open connection current flows through resistor #1, through the potentiometer into the capacitor. So whether the NE555 is acting as a short or open circuit, current is flowing through the potentiometer, but when acting as a short it flows through r2 and when acting as an open current flows through r1. If r1 and r2 are equal, the output is half the time high and half the time low.

Figure 13:
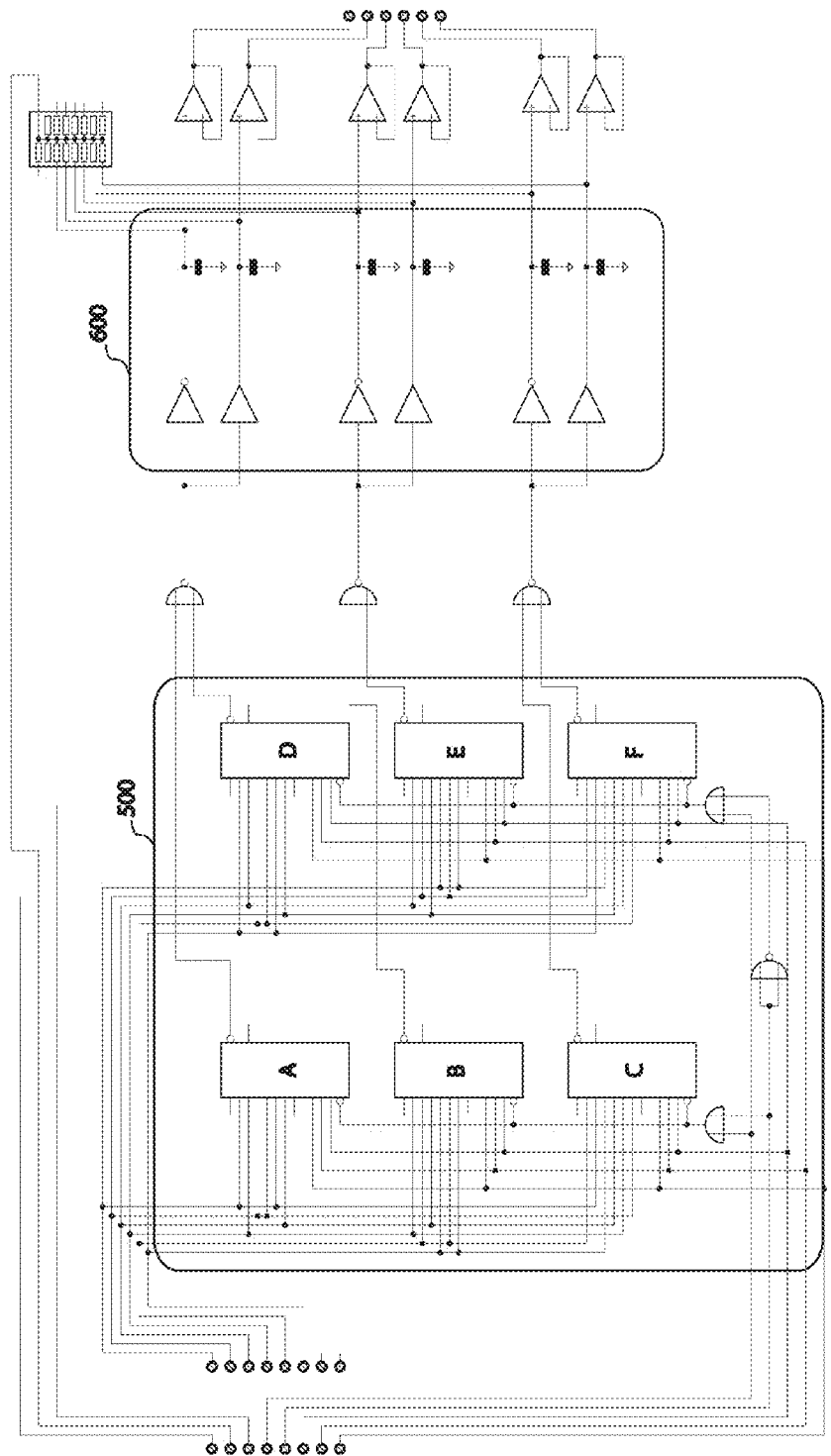
FIG. 13 is 3-phase Mod-12 multiplexers with turn on delays & impedance isolation via voltage followers.
Figure 14:
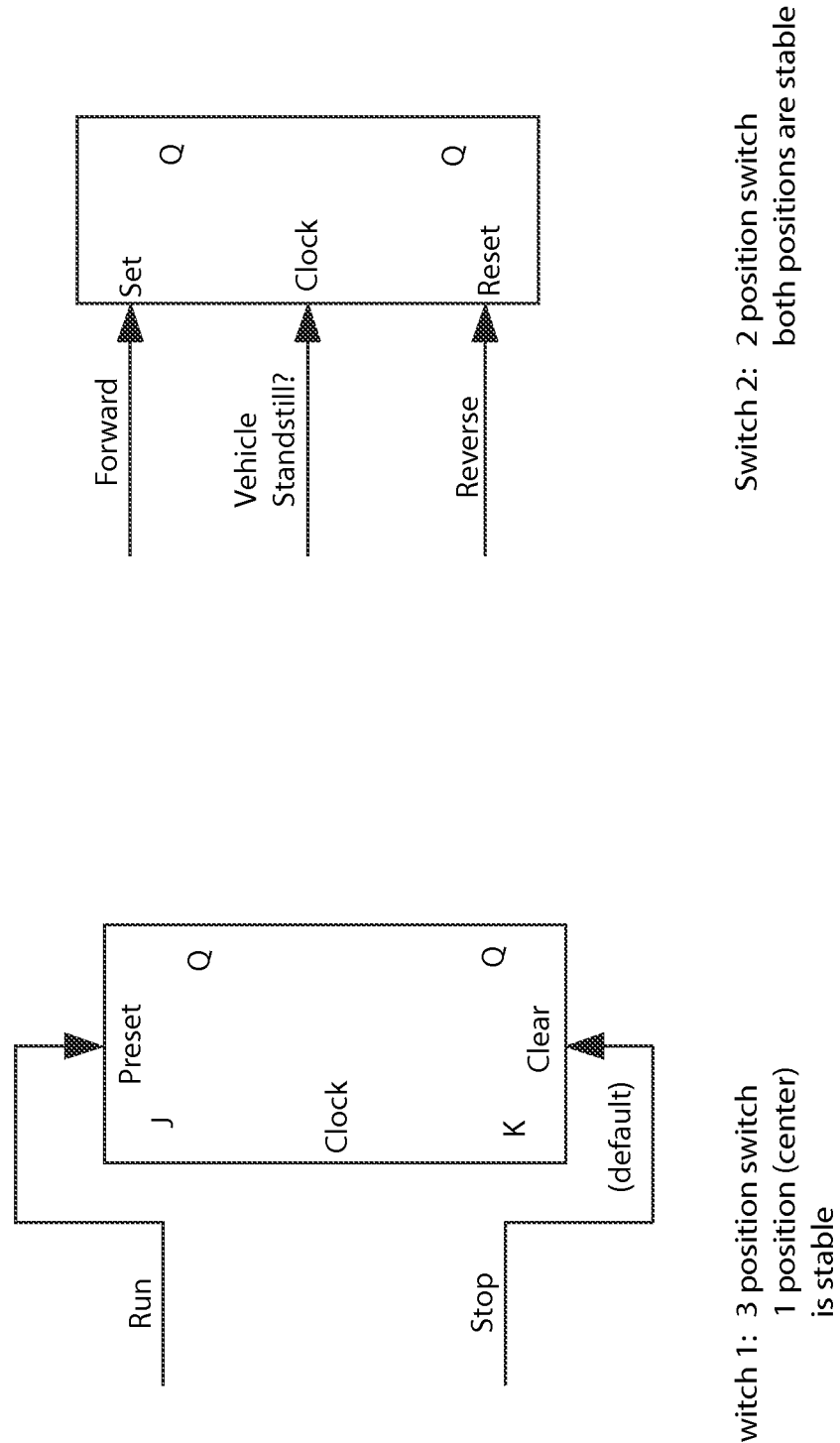
FIG. 14 is a Diagram of two hardwired switches SW1 (RUN/STOP) and SW2 (Forward & Reverse).

FIG. 13 is the back end of the mod-12 SVM unit. The "A" & "D" multiplexers work together as a single multiplexer for channel A. The integrated circuits marked "B" & "E" work as a single multiplexer for the B channel. The same can be said of the "C" & "F" integrated circuits. They serve the same function as those of FIG. 11 except each multiplexer of FIG. 11 has only 3 bit addressing.

To handle the 4 bit addresses the mod-12 SVM unit required that the "enable" input of the multiplexer circuit be used as a sort of extra address line. Besides using the "enable" line as an address line, it required an extra NOR gate as an inverter (by tying both inputs together the NOR and NAND gates can be used as inverters) and only the negative logic output of each multiplexer can be used. Once all the signals of one phase are gathered together only then can the positive and negative logic signals be separated out into "top" and "bottom" transistor signals for each phase of the VSI. Label 600 is the same as label 600 on FIG. 11.

For most devices, when they're turned off they conduct no power and aren't likely to burn up. Usually, an amount of time, "blanking time", refers to the amount of time when neither (of two series connected switch) devices in any one leg of a Voltage Source Inverter is conducting while the VSI is in normal operations. This "blanking time" deals with the non-instantaneous amount of time it takes for a LARGE transistor to fully switch on or off and the period of time provided for both switches to cease conducting. If each switch runs at full speed during switch-off, but is delayed a bit during switch-on, the goals of providing a blanking time should be met.

This has been done using NE555s providing 'turn-on delays" in other circuits for years. In this invention, in FIGS. 11 and 13, the "turn-on delay" circuit is simplified by using a capacitor with a "pull-up" resistor at the output of an Open Collector buffer. While experimenting with this and using an oscilloscope there was a delay on one side of a square wave while there was no delay on the square wave's other side. This performs as expected during "turn-on" and shows no delay involved during switch "turn-off" (as illustrated clearly in the last two graphs of FIG. 15.

The VSI's upper transistor gating signals are 120 degrees out of phase with each other and all the big VSI "switch" transistors are sequenced to change state one switch pair at a time during normal operation. The synthetic SVM circuit mimics SVM through the use of time division multiplexing and center-aligned pulse trains. Unless otherwise defined, PWM has been associated with X-ORing a high frequency carrier triangle waveform to a lower frequency sine wave, amplifying the resultant digital wave form and filtering the output waves reproducing the original sine. Third order harmonic injection is a modification of the process which allows for greater DC bus utilization.

Figure 5:
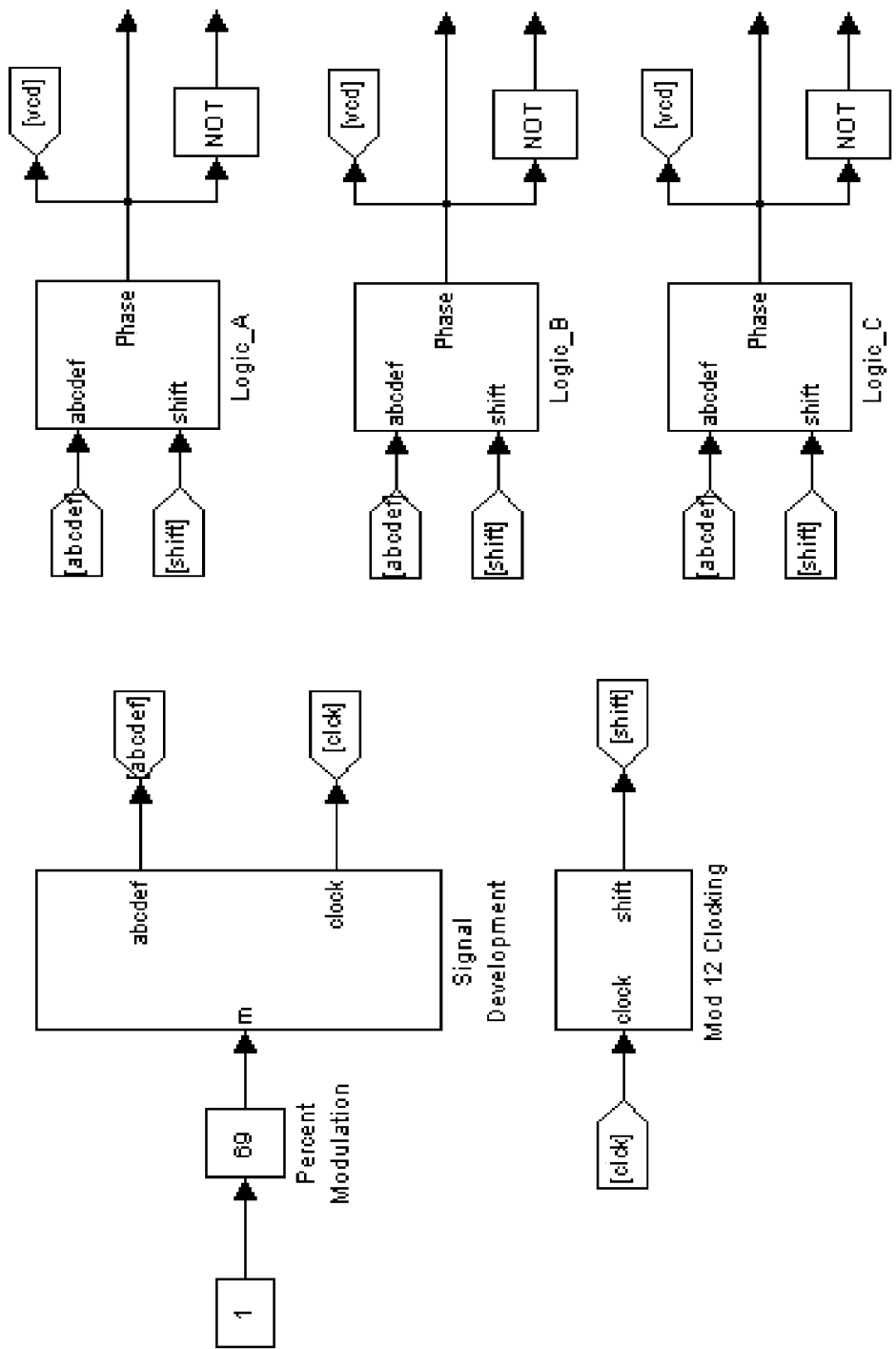
FIG. 5 is Simulink™ block diagram of a (Mod-12) Synthetic SVM unit.

For the present invention, two synthetic SVM units (mod-6 and mod-12) were designed and constructed. The schematics for the units appear in FIGS. 8-13, while a high level Simulink® diagram of the mod-12 unit is shown in FIG. 5. The Signal Development block contains a function generator and comparators producing the pulse trains and clocking signal. For both units, all three-phases shared a common triangle wave generator, circled and labelled in FIGS. 8, 10 and 12 as 200. The VFO is made using a standard NE555 integrated circuit. The NE555 is standardized, yet can be wired up as a single frequency oscillator, a delay generator or any of a number of other things. The thing that allows "hand tuning" of the VFO is the potentiometer labeled 100a on FIGS. 8, 10 & 12. As the knob on the potentiometer is turned, it shorts itself out (or does the inverse—inserts itself into the circuit). It provides no voltage to any other point of the circuit. Its only purpose is to provide a variable resistance to the circuit surrounding the 555 making the very ordinary NE555 into a VFO. The sawtooth comes from the top of the capacitor and goes through an Op-Amp wired up as a voltage follower then the voltage is amplified to a zero to fifteen volt level and later the sawtooth waveform is flipped over. The square wave of the VCO comes from the NE555's five volt, TTL compatible output.

Figure 8:
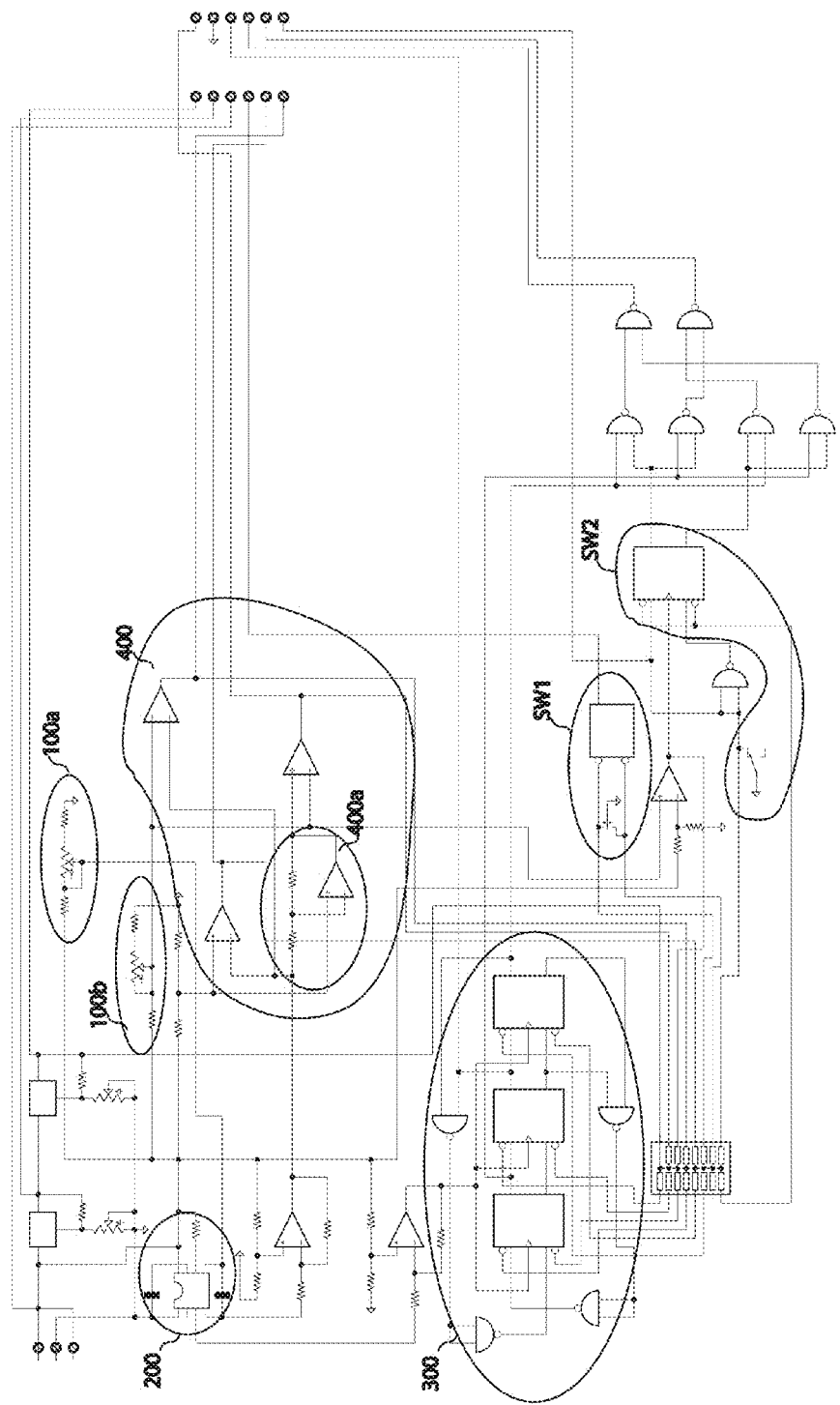
FIG. 8 is an early version of the Mod-6 Johnson counter with 3 center aligned pulse-trains circuitry.

In FIG. 8, the triangle wave is produced using an NE566 function generator chip, (however as long as the oscillator produces both a saw-tooth and square wave signals of the same frequency, it meets the necessary qualifications). Inside label 400 are three comparators (400b) and a single op-amp/inverter (surrounded by two resistors) (400a). Each of the three comparators produces one of the three pulse trains required of the mod-6 SVM unit. Notice the two op-amp units between label 200 & 300. The NE566 produced small and badly centered sawtooth & square waves, so some sort of amplifier is needed for each of these waves the NE566 produced.

LM393 dual comparator chips were used to produce the pulse trains, circled and labeled in FIGS. 8, 10 and 12 as 400.

The mod-N Clocking block is a Johnson counter, circled and labeled in FIGS. 8 & 10 (mod-6) and 12 (mod-12) as 300. The Johnson counter was constructed using 74112 JK flip-flops. If a three flip-flop counter is designed right it can avoid minterms 2 & 5, leaving it a sequence of 6 numbers (modulus of 6 [or mod-6]) it can sequence through. A 'mod-12' Johnson counter can be made from a 'mod-6' counter by adding a fourth flip-flop wired up to 'toggle' just as the mod-6 counter resets. This will make a mod-12 counter out of a mod-6 counter. There are also circuits that can be taken 'off-the-shelf' from an electronic hobbyist parts store that simplify building a mod-N counter. The logic blocks (in the Simulink™ code-drawings) represent partial internals of the 74251 multiplexer chips. The six outputs from the three-phase multiplexer (logic blocks) are the raw gating signals for the VSI.

The Simulink™ model contains logic inside the mod-N clocking and logic blocks mimicking the function of the 74251 multiplexer chips, circled and labeled in FIGS. 9 & 11 (mod-6) and 13 (mod-12) as 500. Both the mod-6 and mod-12 "wire-wrapped" models produce the same gating signals as the Simulink™ versions do, but they are constructed with hardware logic. The circuit is much more compact in nature than the simulation. With SVM, the VSI is treated as a synchronized system. However, PWM sees the VSI as three isolated push-pull amplifiers. This is the primary difference between the two methods. In short, SVM has at least three major characteristics distinguishing it from PWM. These are:
(1) the VSI is treated as if it were the output of three flip-flops with eight possible states,
(2) the VSI's upper and lower switches are generally the logical inverse of each other except when both switches are off for dead time and emergencies, and
(3) the VSI switching minimization is similar to Gray codes found in digital electronics apparatus and texts.

In order to prevent shoot-through in a VSI switch leg, dead-time must exist between the turn-off of one switch and the turn-on of the other switch. Shoot-through occurs if both switches are simultaneously 'on' due to the characteristics of real switch operations. The shoot-through or short-circuit path is across the DC bus feeding the VSI.

Figure 6:
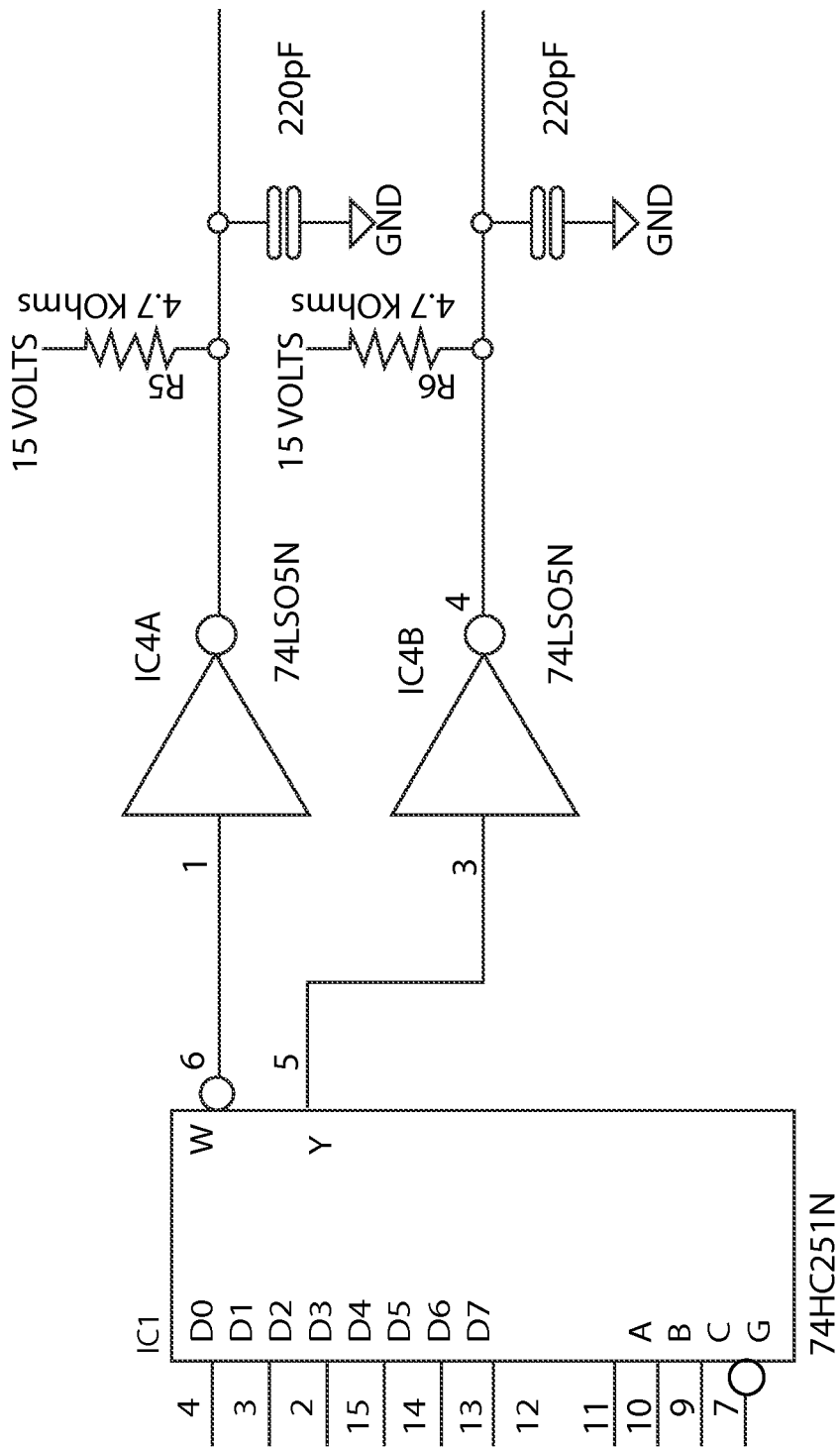
FIG. 6 is Mod-6 Multiplexing (with Turn-on delay circuits) for both of the Transistors of a VSI's Single Phase.

Further, the introduction of unwanted torque pulsations from harmonics in the voltage waveform of a motor is undesirable. Torque pulsations from electric motors are operational imperfections and should be eliminated wherever and whenever possible. The "dead-time" during switch transitions of the VSI often produces pulsations. Fortunately, the multiplexer (74251) provided both an output and its logical inverse accommodating upper and lower VSI switches. The open-collector function was accomplished using additional inverters (7405). The schematic of the turn-on delay circuit is present in FIG. 6. This drawing emphasizes the relationship of the multiplexer chip, its output to Open Collector inverter/drivers and the turn-on delay (Resistor & Capacitor) circuit added to the output of the inverter. The output of the inverter is normally taken "as is", but needing 15 volt outputs it required Open Collector devices to translate the output of the 74HC251 (multiplexer) from 5 volts to 15 volts.

Figure 7:
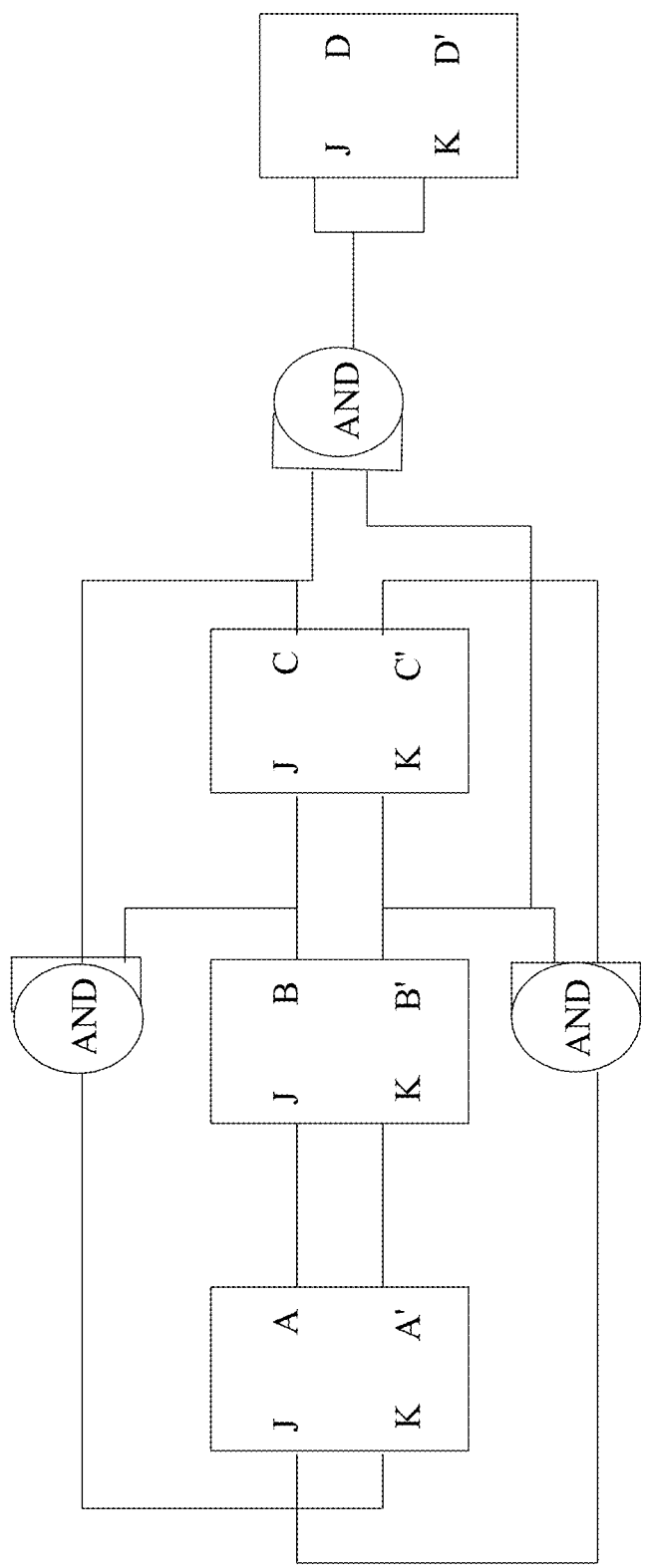
FIG. 7 is Mod-12 Johnson counter circuit, self-correcting.

In order for the synthetic SVM unit to operate correctly, it requires (1) the desired frequency and (2) the desired modulation-depth, circled and labeled in FIGS. 8 & 10 (mod-6) and 12 (mod-12) as 100a and 100b. For the synthetic SVM hardware, the requested frequency range is 1,270 Hz≤f≤12.4 kHz where the analog input requires 0V≤$V_f$≤15V, respectively. The requested modulation depth range is 0%≤m≤95% where the analog input requires 0V≤$V_m$≤15V, respectively. In addition, the six gating signals from the synthetic SVM to the VSI unit as seen in FIG. 7 use 0V and 15V to indicate "off" and "on", respectively.

Upon examination, the Alt-Rev SVM switching sequence looked like it could be reproduced (mimicked) by three multiplexed center-aligned pulse trains. Because the synthesized waveforms produced by the hardware built for the present invention are identical to the SVM switching waveforms, it became apparent that PWM equipment is not necessary for the production of SVM even though the literature leads one to believe that PWM equipment is required.

Be that as it may, synthetic SVM has a fixed relationship between the fundamental frequency and the switching frequency. PWM generally does not have a fixed switching frequency and is somewhat independent of the modulation. For PWM it is possible to manually set the switching to fundamental frequency ratios, but for SVM equipment the ratio of the two frequencies is only alterable by using different equipment. Ideally, for PWM, the carrier (switching) frequency is therefore floating around some ideal center value that permits odd integer numbers of pulses per half cycle. These two methods are therefore inherently different in philosophy.

Figure 15:
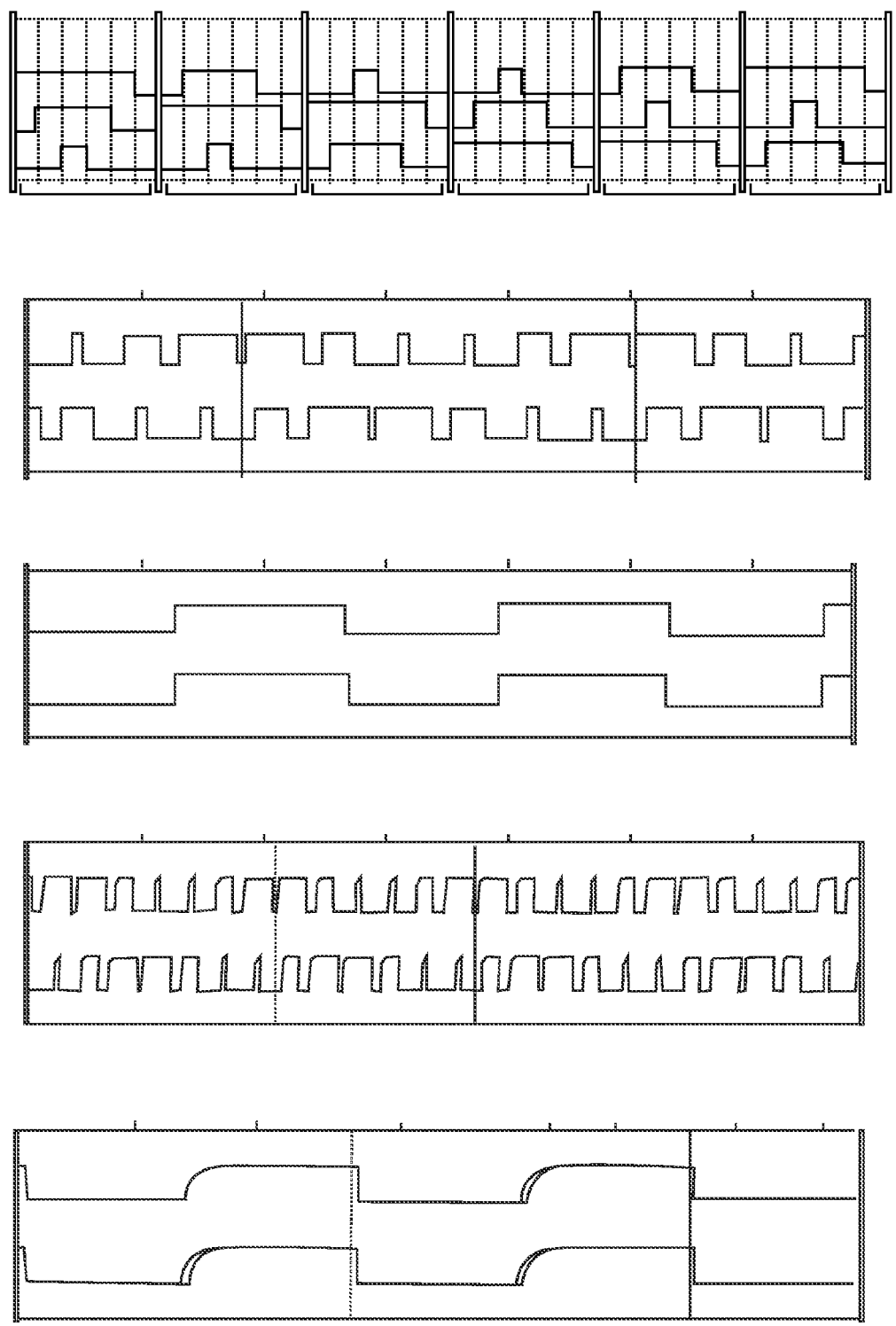
FIG. 15 is a Diagram of multiplexed, center aligned pulse trains produced by the mod-6 version of invention.
Figure 16:
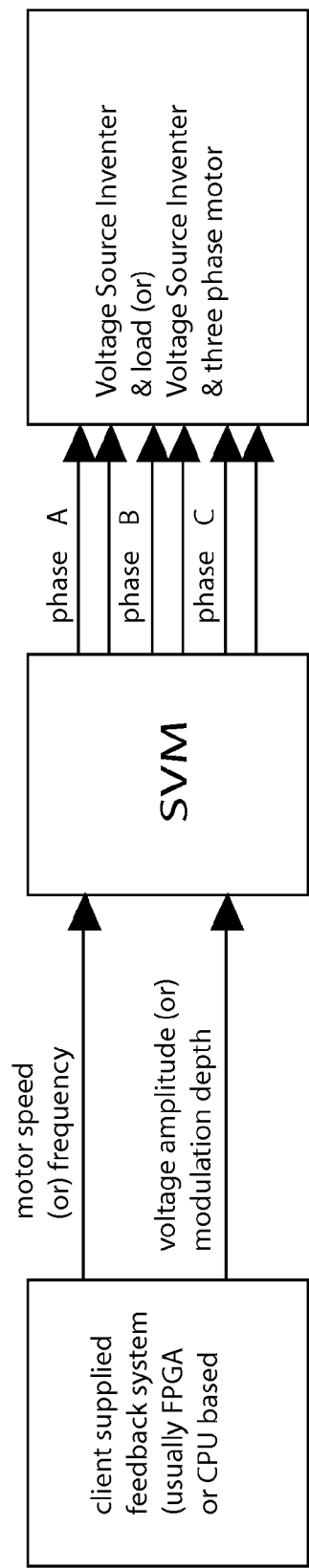
FIG. 16 is a Diagram showing how the invention interacts with the external world.

In FIG. 15 the top graph is what should come from an SVM device and graphs two, three, four & five underneath were taken from the mod-6 version of the SVM device built with wire-wrap tools & an oscilloscope. Graph two is of the mod-6 devices output at low speed and full modulation. Graph three is the same device at low speed & no modulation. Graph four is the same device at full speed and full modulation and graph five is the same device at full speed & no modulation.

Figure 17:
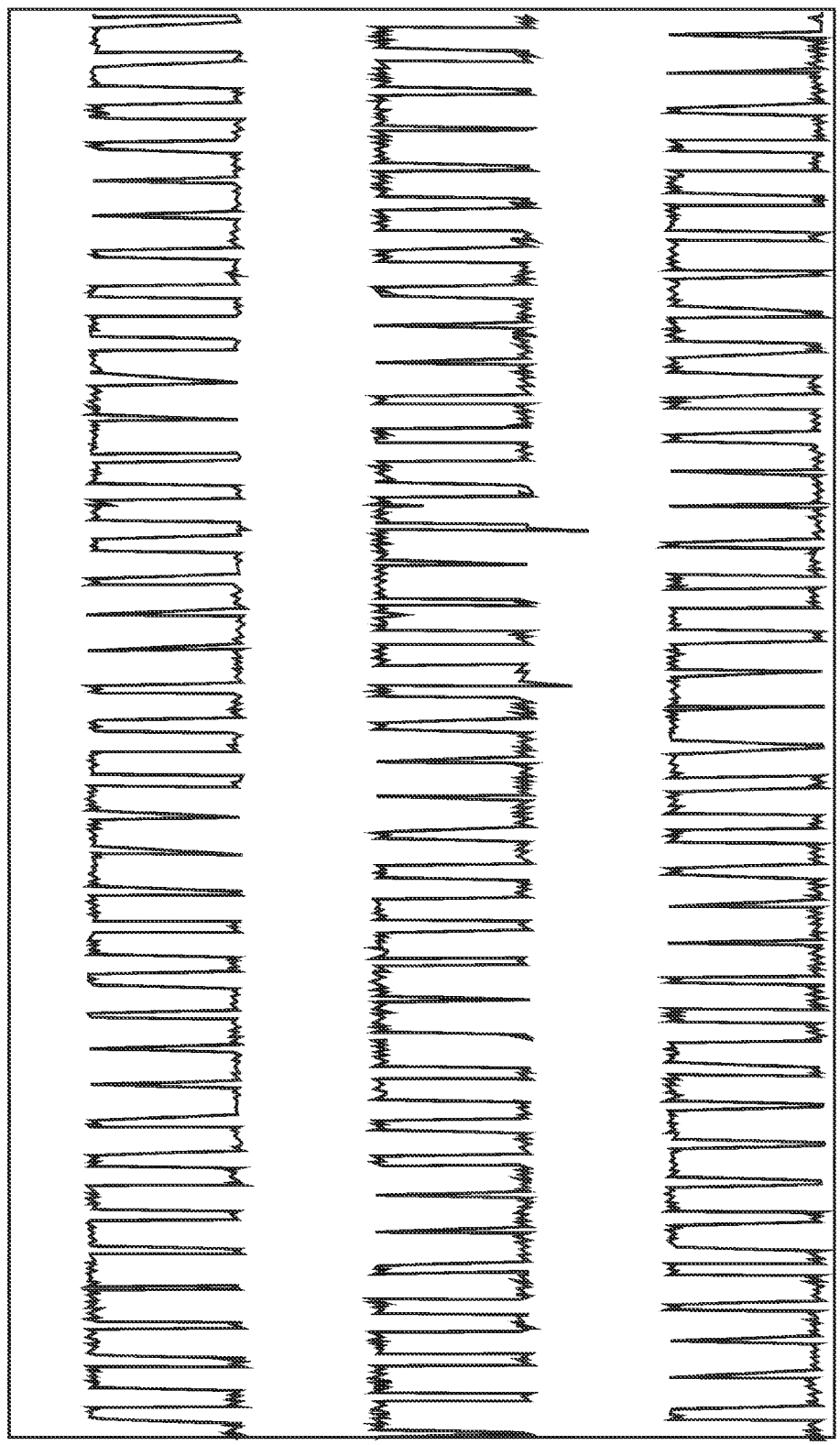
FIG. 17 is a Diagram of the 3 phase output of the mod-12 SVM unit.

FIG. 17 is three phase output of the mod-12 SVM unit. The three channels are 120 degrees removed from each other and the six different size pulses, on each channel, march up in width then march down in width. The overall effect is that if sent to a three phase motor each phase would be interpreted as a sine-like wave.

For synthetic SVM at any motor rotational speed, the switching speed limit becomes the modulus number (N) times the output fundamental frequency ($f_{max}$=N$f_{out}$) where $f_{max}$ is the switching frequency limit of the VSI. Additionally, Space Vector Modulation may be beneficial for high speed motor operations where VSI limits are a concern.

Although the invention has been explained in relation to its preferred embodiment, it is to be understood that many other possible modifications and variations can be made without departing from the spirit and scope of the invention as herein claimed.

What is claimed is:

1. A synthetic space vector modulation (SVM) device for controlling a voltage source inverter (VSI) and load, or VSI and three phase motor, comprising:
a variable frequency oscillator (VFO);
a center-aligned pulse-train signal generator;
a modulo-N counter, where N is an even integer equal to or greater than 6; and
a three-phase time division multiplexer, wherein the VFO outputs a square wave to the modulo-N counter and a triangle wave of the same frequency to the center-aligned pulse-train signal generator, the outputs of the center-aligned pulse-train generator and the modulo-N counter are sent to the three-phase time division multiplexer, and after leaving the multiplexers, and before being sent to the VSI controller's load each positive and each negative output of the multiplexing phase is sent to a turn-on delay.

2. The synthetic SVM device of claim 1, wherein each phase's upper transistor gating signals for the VSI is 120 degrees out of phase with each of the other two phases (in three phase units) and sequenced to change state one switch at a time.

3. The synthetic SVM device of claim 1, wherein the VFO outputs a 15 volts peak to peak triangle wave to the center aligned pulse train generator and a 5 volts peak to peak square wave to the modulo-N counter.

4. The synthetic SVM device of claim 1 wherein the frequency of the triangle and square wave is controlled by a potentiometer attached to the VFO.

5. The synthetic SVM device of claim 4 wherein the frequency range is 1,270 Hz≤f≤12.4 kHz and where the analog input requires 0V≤$V_f$≤15V, respectively.

6. The synthetic SVM device of claim 1 wherein the modulation depth is controlled by a potentiometer attached to the center-aligned pulse train generator.

7. The synthetic SVM device of claim 6 wherein the modulation depth range is 0%<=m<=95% from the potentiometer.

8. The VSI controller (synthetic SVM device) of claim 1 wherein the synthetic SVM device includes at least one wired-OR arrangement emergency stop or run switch.

9. The synthetic SVM device of claim 8 wherein the hard-wired emergency stop or run switch is placed between the modulo-N counter and the multiplexer.

10. The synthetic SVM device of claim 1 wherein the synthetic SVM device includes a forward/reverse switch.

11. The synthetic SVM device of claim 10 wherein the forward or reverse switch is placed between the modulo-N counter and the multiplexer.

12. The synthetic SVM device of claim 1, wherein the modulo-N counter is mod-6.

13. The synthetic SVM device of claim 1, wherein the modulo-N counter is mod-12.

14. The synthetic SVM device of claim 1, wherein dual comparator chips are used to produce the pulse trains.

15. The synthetic SVM device of claim 14 wherein the dual comparator chips are LM393 dual comparator chips.

16. The synthetic SVM device of claim 1 wherein the modulo-N counter is a Johnson counter.

17. The synthetic SVM device of claim 16 wherein the Johnson counter is constructed using 74112 JK flip-flops.

18. The synthetic SVM device of claim 1 wherein the multiplexer is a 74251 multiplexer chip.

19. A method for driving a Voltage Source Inverter (VSI) and load, or VSI and three phase motor, the method comprising:

using a VFO to output a triangle and square wave of the same frequency;

inputting the square wave into a modulo-N flip-flop counter, where N is an even integer divisible by 3 and equal to or greater than 6;

inputting the triangle wave into a center aligned pulse train generator to generate N/2 center aligned pulse train signals;

inputting the outputs of the modulo-N flip flop counter into selected inputs of a three-phase time division multiplexer;

inputting each of the N/2 center aligned pulse train signals into two selected inputs of the three-phase time division multiplexer;

sending each of the positive and negative phases output from the multiplexers to a turn-on delay; and driving the VSI (and load) with the three pairs of positive and negative signals, thus producing a three phase signal.

20. A synthetic SVM drives a VSI (and load), the Synthetic SVM is comprised of:

(1) a VFO outputting a triangle wave to a center aligned pulse wave generator and a square wave to a modulo-N counter, where N is an even number greater than 6, where the triangle and square wave are of the same frequency, (2) the center aligned pulse wave generator producing N/2 pulse-trains of different sizes to (3) a three phase multiplexer, and (4) the modulo-N counter outputting to the three phase multiplexer, and where the "turn-on" output of each multiplexer is delayed before being input into the VSI.

* * * * *